United States Patent
Li et al.

(10) Patent No.: US 11,321,314 B2
(45) Date of Patent: May 3, 2022

(54) QUERY CONTENT-BASED DATA GENERATION

(71) Applicant: INTERNATIONAL BUSINESS MACHINES CORPORATION, Armonk, NY (US)

(72) Inventors: Shuo Li, Beijing (CN); Xiaobo Wang, Beijing (CN); ShengYan Sun, Beijing (CN); Hong Mei Zhang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 70 days.

(21) Appl. No.: 16/881,139

(22) Filed: May 22, 2020

(65) Prior Publication Data

US 2021/0365451 A1  Nov. 25, 2021

(51) Int. Cl.
| | |
|---|---|
| *G06F 16/2453* | (2019.01) |
| *G06F 16/242* | (2019.01) |
| *G06F 9/30* | (2018.01) |
| *G06F 16/22* | (2019.01) |
| *G06F 16/28* | (2019.01) |

(52) U.S. Cl.
CPC .... *G06F 16/24535* (2019.01); *G06F 9/30029* (2013.01); *G06F 16/221* (2019.01); *G06F 16/2282* (2019.01); *G06F 16/2428* (2019.01); *G06F 16/288* (2019.01)

(58) Field of Classification Search
CPC ............. G06F 16/24532; G06F 16/283; G06F 16/24535; G06F 16/252

USPC ........................................................ 707/713
See application file for complete search history.

(56) References Cited

U.S. PATENT DOCUMENTS

| | | | |
|---|---|---|---|
| 6,289,334 B1 | 9/2001 | Reiner et al. | |
| 7,240,078 B2 * | 7/2007 | Cheng | ............... G06F 16/24539 |
| 7,653,610 B2 | 1/2010 | Abrashkevich et al. | |
| 8,631,000 B2 | 1/2014 | Franke et al. | |

(Continued)

OTHER PUBLICATIONS

Pollack, "Query Optimization Techniques in SQL Server: Tips and Tricks", SQLShack, Jun. 19, 2018, pp. 1-17.

(Continued)

*Primary Examiner* — Hung T Vy
(74) *Attorney, Agent, or Firm* — William Hartwell; Matthew M. Hulihan; Heslin Rothenberg Farley & Mesiti PC

(57) ABSTRACT

Query content-based data generation includes obtaining a query having an outer query and one or more subqueries, performing subquery transformation on each subquery, which converts predicates of the subqueries to be predicates of the outer query, and thereby obtain a transformed query, generate from the transformed query block(s) each having a list of predicates selected from the transformed query, processing each query block for column information, including column range information and column relationship information, and generating data and populating a dataset having table(s) and respective column(s) for each of the table(s). Generating the data uses the column range information and the column relationship information to select data for the dataset such that data records from the dataset are produced as results to executing the obtained query against the dataset.

20 Claims, 13 Drawing Sheets

```
                                        100a
SELECT ORDER.order_id
    FROM ORDER, ORDER2
┌─────────────────────────────────────────────────────────────┐
│ WHERE ORDER2.ORDER_ID < 105 AND EXISTS                      │
│     (SELECT 1                                               │
│      FROM WAREHOUSE,DISTRICT2                               │──102
│      WHERE WAREHOUSE.warehouse_id = DISTRICT2.district_warehouse_id │
│      AND WAREHOUSE.warehouse_id = ORDER.order_warehouse_id  │
├─────────────────────────────────────────────────────────────┤
│      AND DISTRICT2.district_id IN                           │
│         (SELECT CUSTOMER.customer_district_id               │──104
│          FROM CUSTOMER                                      │
├─────────────────────────────────────────────────────────────┤
│          WHERE EXISTS                                       │
│             (SELECT 1                                       │
│              FROM WAREHOUSE2,CUSTOMER2                      │
│              WHERE WAREHOUSE2.warehouse_id =                │
│                  CUSTOMER2.customer_warehouse_id            │──106
│              AND CUSTOMER2.customer_district_id =           │
│                  CUSTOMER.customer_district_id              │
│              AND CUSTOMER2.customer_district_id =           │
│                  ORDER.order_district_id                    │
├─────────────────────────────────────────────────────────────┤
│          OR ORDER.ORDER_DISTRICT_ID IN(                     │
│          SELECT ORDER2.ORDER_DISTRICT_ID                    │
│          FROM ORDER2                                        │
│          WHERE ORDER.ORDER_CARRIER_ID =                     │──108
│              ORDER2.ORDER_CARRIER_ID                        │
│          AND ORDER2.ORDER_ID < 105                          │
└─────────────────────────────────────────────────────────────┘
    ))));
```

```
                                        100b
SELECT ORDER.order_id
    FROM ORDER, ORDER2
┌─────────────────────────────────────────────────────────────┐
│ ORDER2.ORDER_ID < 105                                       │
│ AND WAREHOUSE.warehouse_id = DISTRICT2.district_warehouse_id │──102'
│     AND WAREHOUSE.warehouse_id = ORDER.order_warehouse_id   │
├─────────────────────────────────────────────────────────────┤
│ AND DISTRICT2.district_id IN                                │
│     (SELECT CUSTOMER.customer_district_id                   │──104
│      FROM CUSTOMER                                          │
├─────────────────────────────────────────────────────────────┤
│      WHERE EXISTS                                           │
│         (SELECT 1                                           │
│          FROM WAREHOUSE2,CUSTOMER2                          │
│          WHERE WAREHOUSE2.warehouse_id =                    │
│              CUSTOMER2.customer_warehouse_id                │──106
│          AND CUSTOMER2.customer_district_id =               │
│              CUSTOMER.customer_district_id                  │
│          AND CUSTOMER2.customer_district_id =               │
│              ORDER.order_district_id                        │
├─────────────────────────────────────────────────────────────┤
│      OR ORDER.ORDER_DISTRICT_ID IN(                         │
│      SELECT ORDER2.ORDER_DISTRICT_ID                        │
│      FROM ORDER2                                            │
│      WHERE ORDER.ORDER_CARRIER_ID =                         │──108
│          ORDER2.ORDER_CARRIER_ID                            │
│      AND ORDER2.ORDER_ID < 105                              │
└─────────────────────────────────────────────────────────────┘
    ))));
```

(56) References Cited

U.S. PATENT DOCUMENTS

| | | | |
|---|---|---|---|
| 8,868,544 B2 * | 10/2014 | Witkowski | G06F 16/283 |
| | | | 707/713 |
| 9,110,946 B2 | 8/2015 | Chen et al. | |
| 10,387,422 B2 | 8/2019 | Cialini et al. | |
| 2005/0114311 A1 * | 5/2005 | Cheng | G06F 16/24539 |

OTHER PUBLICATIONS

Mell, et al., "The NIST Definition of Cloud Computing", NIST Special Publication 800-145, Sep. 2011, Gaithersburg, MD, pp. 1-7.

* cited by examiner

```
SELECT ORDER.order_id
  FROM ORDER, ORDER2
```
```
WHERE ORDER2.ORDER_ID < 105 AND EXISTS
    (SELECT 1
      FROM WAREHOUSE,DISTRICT2
      WHERE WAREHOUSE.warehouse_id = DISTRICT2.district_warehouse_id
      AND WAREHOUSE.warehouse_id = ORDER.order_warehouse_id
```
— 102

```
      AND DISTRICT2.district_id IN
          (SELECT CUSTOMER.customer_district_id
            FROM CUSTOMER
```
— 104

```
            WHERE EXISTS
                (SELECT 1
                  FROM WAREHOUSE2,CUSTOMER2
                  WHERE WAREHOUSE2.warehouse_id =
                      CUSTOMER2.customer_warehouse_id
                  AND CUSTOMER2.customer_district_id =
                      CUSTOMER.customer_district_id
                  AND CUSTOMER2.customer_district_id =
                      ORDER.order_district_id
```
— 106

```
                OR ORDER.ORDER_DISTRICT_ID IN(
                  SELECT ORDER2.ORDER_DISTRICT_ID
                    FROM ORDER2
                    WHERE ORDER.ORDER_CARRIER_ID =
                          ORDER2.ORDER_CARRIER_ID
                    AND ORDER2.ORDER_ID < 105
```
— 108

```
SELECT ORDER.order_id
    FROM ORDER, ORDER2
```

```
ORDER2.ORDER_ID < 105
AND WAREHOUSE.warehouse_id = DISTRICT2.district_warehouse_id
    AND WAREHOUSE.warehouse_id = ORDER.order_warehouse_id
```
~102'

```
    AND DISTRICT2.district_id IN
        (SELECT CUSTOMER.customer_district_id
         FROM CUSTOMER
```
~104

```
         WHERE EXISTS
             (SELECT 1
              FROM WAREHOUSE2,CUSTOMER2
              WHERE WAREHOUSE2.warehouse_id =
                      CUSTOMER2.customer_warehouse_id
              AND CUSTOMER2.customer_district_id =
                      CUSTOMER.customer_district_id
              AND CUSTOMER2.customer_district_id =
                      ORDER.order_district_id
```
~106

```
         OR ORDER.ORDER_DISTRICT_ID IN(
         SELECT ORDER2.ORDER_DISTRICT_ID
             FROM ORDER2
         WHERE ORDER.ORDER_CARRIER_ID =
                      ORDER2.ORDER_CARRIER_ID
         AND ORDER2.ORDER_ID < 105
```
~108

```
SELECT ORDER.order_id
  FROM ORDER, ORDER2
```
```
ORDER2.ORDER_ID < 105                                           ~102'
AND WAREHOUSE.warehouse_id = DISTRICT2.district_warehouse_id
AND WAREHOUSE.warehouse_id = ORDER.order_warehouse_id
```
```
AND DISTRICT2.district_id = CUSTOMER.customer_district_id       ~104'
```
```
AND EXISTS
    (SELECT 1
       FROM WAREHOUSE2,CUSTOMER2
     WHERE WAREHOUSE2.warehouse_id =
         CUSTOMER2.customer_warehouse_id                         ~106'
     AND CUSTOMER2.customer_district_id =
         CUSTOMER.customer_district_id
     AND CUSTOMER2.customer_district_id =
         ORDER.order_district_id
```
```
     OR ORDER.ORDER_DISTRICT_ID IN (
     SELECT ORDER2.ORDER_DISTRICT_ID
       FROM ORDER2
     WHERE ORDER.ORDER_CARRIER_ID =                              ~108
         ORDER2.ORDER_CARRIER_ID
     AND ORDER2.ORDER_ID < 105
```
))));

FIG. 1C

```
SELECT ORDER.order_id
  FROM ORDER, ORDER2
```
```
  ORDER2.ORDER_ID < 105                                              ~102'
  AND WAREHOUSE.warehouse_id = DISTRICT2.district_warehouse_id
      AND WAREHOUSE.warehouse_id = ORDER.order_warehouse_id
```
```
  AND DISTRICT2.district_id = CUSTOMER.customer_district_id         ~104'
```
```
  AND WAREHOUSE2.warehouse_id =
          CUSTOMER2.customer_warehouse_id
      AND CUSTOMER2.customer_district_id =                          ~106'
          CUSTOMER.customer_district_id
      AND CUSTOMER2.customer_district_id =
          ORDER.order_district_id
```
```
      OR ORDER.ORDER_DISTRICT_ID IN (
      SELECT ORDER2.ORDER_DISTRICT_ID
         FROM ORDER2
      WHERE ORDER.ORDER_CARRIER_ID =                                ~108
          ORDER2.ORDER_CARRIER_ID
      AND ORDER2.ORDER_ID < 105
```
))));

FIG. 1D

```
SELECT ORDER.order_id
    FROM ORDER, ORDER2
    ORDER2.ORDER_ID < 105
    AND WAREHOUSE.warehouse_id = DISTRICT2.district_warehouse_id       ~102'
        AND WAREHOUSE.warehouse_id = ORDER.order_warehouse_id
    AND DISTRICT2.district_id = CUSTOMER.customer_district_id          ~104'
    AND WAREHOUSE2.warehouse_id =
            CUSTOMER2.customer_warehouse_id
        AND CUSTOMER2.customer_district_id =
            CUSTOMER.customer_district_id                              ~106'
        AND CUSTOMER2.customer_district_id =
            ORDER.order_district_id
    OR (ORDER.ORDER_DISTRICT_ID = ORDER2.ORDER_DISTRICT_ID
        AND ORDER.ORDER_CARRIER_ID =
            ORDER2.ORDER_CARRIER_ID
        AND ORDER2.ORDER_ID < 105                                      ~108'
))));
```

QUERY CONTENT-BASED DATA GENERATION

BACKGROUND

The gathering, storage, and use of data is ubiquitous and, as a result, reliance on databases and queries on the databases has become prevalent. This in turn drives development of database functions and capabilities, as well as functionality testing and problem troubleshooting. Development and problem troubleshooting may be heavily reliant on the ability to test database functionality through the provision of queries to the database. Test cases/queries may be expected to deliver query results, such as data records, in order recreate observed problems, for instance. Queries are sometimes to be submitted against databases with actual data even if just for testing purposes.

In some settings, a query that is problematic in terms of producing a desired response may be provided without the dataset/database against which the query is being submitted when producing the problem. A specific example of this situation is when a customer provides to a vendor a problematic query without the customer's actual data against which the query is being run by the customer.

SUMMARY

Shortcomings of the prior art are overcome and additional advantages are provided through the provision of a computer-implemented method. The method obtains a query. The query has an outer query and one or more subqueries of the outer query. The method also performs subquery transformation on each subquery of the one or more subqueries to obtain a transformed query. The subquery transformation converts predicates of the one or more subqueries to be predicates of the outer query. The method additionally generates from the transformed query one or more query blocks each including a list of predicates selected from the transformed query. The method processes each query block of the one or more query blocks for column information based on the list of predicates of that query block. The column information includes column range information and column relationship information. Further, the method generates data and populates a dataset including one or more tables and a respective one or more columns for each of the one of more tables. Generating the data uses the column range information and the column relationship information to select data for the dataset such that data records from the dataset are produced as results to executing the obtained query against the dataset.

Further, a computer system is provided that includes a memory and a processor in communication with the memory, wherein the computer system is configured to perform a method. The method obtains a query. The query has an outer query and one or more subqueries of the outer query. The method also performs subquery transformation on each subquery of the one or more subqueries to obtain a transformed query. The subquery transformation converts predicates of the one or more subqueries to be predicates of the outer query. The method additionally generates from the transformed query one or more query blocks each including a list of predicates selected from the transformed query. The method processes each query block of the one or more query blocks for column information based on the list of predicates of that query block. The column information includes column range information and column relationship information. Further, the method generates data and populates a dataset including one or more tables and a respective one or more columns for each of the one of more tables. Generating the data uses the column range information and the column relationship information to select data for the dataset such that data records from the dataset are produced as results to executing the obtained query against the dataset.

Yet further, a computer program product including a computer readable storage medium readable by a processing circuit and storing instructions for execution by the processing circuit is provided for performing a method. The method obtains a query. The query has an outer query and one or more subqueries of the outer query. The method also performs subquery transformation on each subquery of the one or more subqueries to obtain a transformed query. The subquery transformation converts predicates of the one or more subqueries to be predicates of the outer query. The method additionally generates from the transformed query one or more query blocks each including a list of predicates selected from the transformed query. The method processes each query block of the one or more query blocks for column information based on the list of predicates of that query block. The column information includes column range information and column relationship information. Further, the method generates data and populates a dataset including one or more tables and a respective one or more columns for each of the one of more tables. Generating the data uses the column range information and the column relationship information to select data for the dataset such that data records from the dataset are produced as results to executing the obtained query against the dataset.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

FIGS. 1A-1E collectively depict example query content, identified query portions, and transformation thereof, in accordance with aspects described herein;

DETAILED DESCRIPTION

Figure 2:
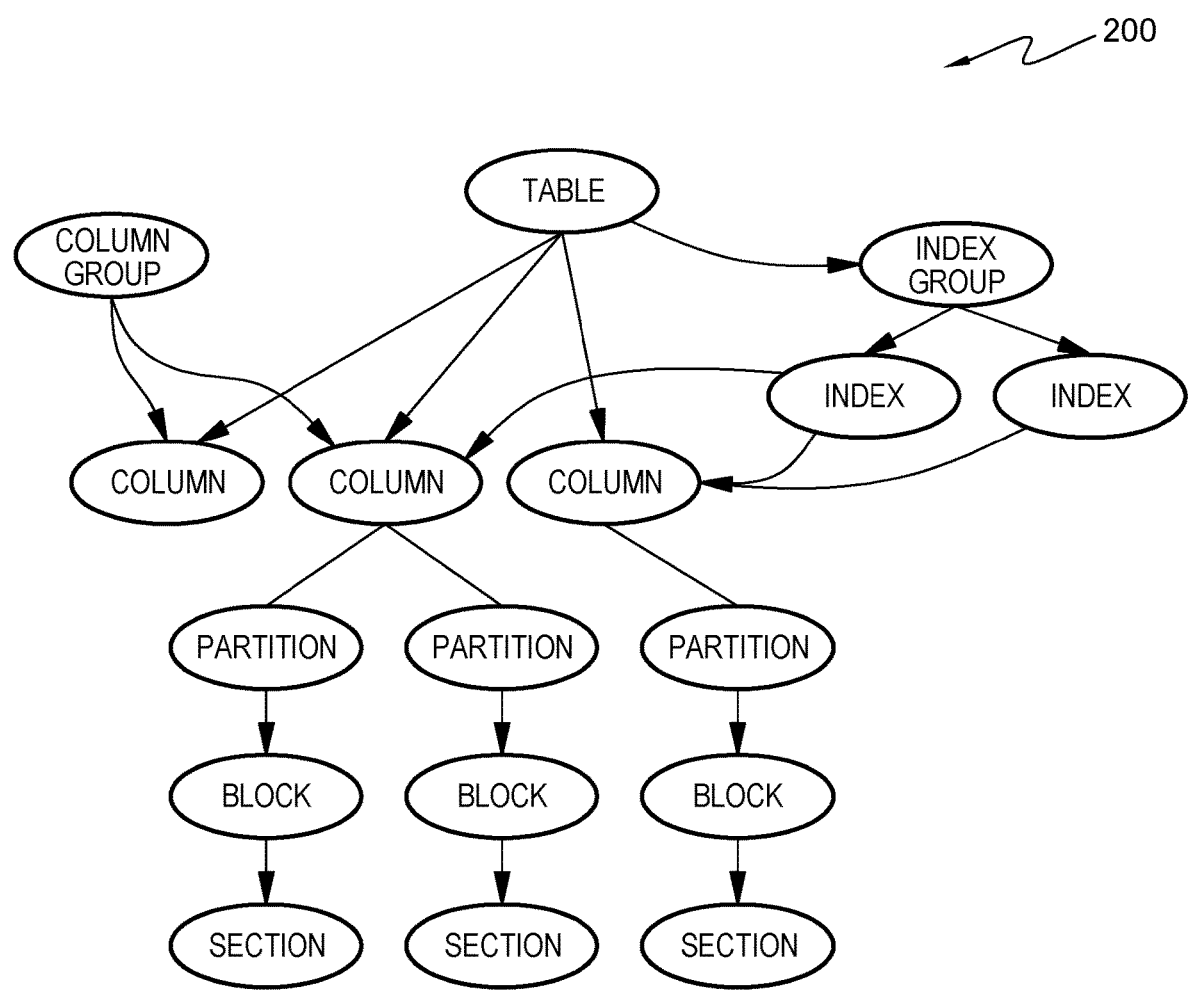
FIG. 2 depicts an example conceptual layout of database objects.

When a query is obtained but no dataset is available against which to run the query, it may be desired to generate such a dataset against which to run the query, for instance for testing or other purposes. Lack of data against which to run the query can be problematic. For instance, it could result in too much resource (time, human resource) spend when attempting to recreate the problem being observed in executing the query. Sometimes, recreation of the problem being experienced by the customer is too difficult without an accurately constructed data set.

An approach to addressing the lack of data is to request from the customer or other entity the data against which the problematic query is being run. This can present potential security/data security risks. Another approach is to obtain from the entity a masked version of the data, however this too can be problematic, for instance if the entity does not have the proper tools, knowledge, or resources to mask the data, or the masking does not provide a desired level of security.

Accordingly, described herein are approaches for query content-based data generation. In some embodiments, this involves query transformation and additional processing that generates data, the generated data is configured such that results are produced when the particular query is run against the generated data (i.e. the data is the target against which the query is evaluated to generate and return results).

FIGS. 1A-1E collectively depict example query content, identified query portions, and transformation thereof, in accordance with aspects described herein. In particular, FIG. 1A presents query content 100a of an example source query. Query content 100a may represent some or all of an entire query. Thus, in some examples, query content 100a is a subset of a larger query, and the execution of the query content is to be tested and/or presents problems to be troubleshooted. It may be that a particular portion (e.g. 100a) of the larger query has been identified as being problematic, for instance, and processing described herein is to be performed against that portion of the larger query, as an example. In other examples, the query content 100a represents the entirety of the query being processed for data generation.

Referring to FIG. 1A, query 100a is an 'outer query' including a 'SELECT . . . FROM . . . ' statement with a WHERE clause and several subqueries. In accordance with aspects described herein, query portions/sections (e.g. 102, 104, 106, 108) are transformed by way of processing the query content, specifically those sections. Ultimately, this can provide a transformed query that is used for data generation. The data generated can in turn be used as a dataset against which to run the query or query content in order to recreate the problem(s) being experienced with the query and/or dataset(s) against which the query is run.

Query content (sometimes referred to herein as just a 'query') is obtained, in some embodiments, along with relevant data definition/description language (DDL) for defining the database schema. DDL associated with database objects can be used in, for instance, the creation and/or modification of database objects, such as tables, indexes, and other objects, as examples. Additionally, in some examples, a database parameter list of parameters/properties of the database is also obtained. It is noted that DDL and/or the data parameters may not be as sensitive from a security or privacy standpoint as the database data itself, and therefore it may be more acceptable to a customer or other entity to share the DDL/parameter information with a vendor to perform the testing/troubleshooting on the query.

FIG. 2 depicts an example conceptual layout of database objects relative to data generation as described herein. The layout 200 shows a root node as a table object. A table has columns (three in this example). A column group refers to/includes two or more columns, and column(s) may be indexed by way of an index object, which also can be into an index group. A column might belong to several indexes but only one index group. Each column may be made of one or more partitions (partition 0 when tablespace is a segment), with each partition having block(s), and each block having one or more section(s).

Additionally or alternatively, various database constraints may be defined, for instance by an administrator or other user, and can factor into the data generation. Example such constraints are a unique index constraint, foreign key constraint, multi column join constraint, check constraint, data type constraint, and partition range constraint, as examples.

Aspects described herein for data generation can support any of various data types, examples of which include but are not limited to: Numerals, such as Integer, Big Integer (BigInt), Small Integer (Smalling Float, Double, Real, Decimal, Decfloat, Timestamp, Data, and Time, as examples; String, such as Char, Varchar, Binary, Varbinary, Graph and Vargraph, as examples; and others, such as Blob, Clob, DBlob, Rowid, Extensible Markup Language (XML) and user-defined datatype (UDT), as examples. The particular types of data to generate in various columns of the generated dataset may be dictated or discernable by the obtained DDL, for example.

A query typically has one or more predicates. Query predicates can be independent (an 'independent' or 'independency' predicate) or dependent (a 'dependent' or 'dependency' predicate). An independent predicate refers to one that does not set forth a dependency or relation among multiple columns of data. An independent predicate relates just one column to a literal, for instance. The predicate ORDER2.ORDER_ID<105 in query portion 108 of FIG. 1A is an example of an independent predicate. A dependent predicate sets forth a dependency or relation between more than one column of data. The predicate WAREHOUSE.warehouse_id=DISTRICT2.district_warehouse_id in query portion 102 of FIG. 1A is an example dependent predicate, as it expresses a relation between values in two different columns (warehouse_id' from table 'WAREHOUSE' and 'district_warehouse_id' from table 'DISTRICT2') for given records. The relation in this example is that the value from each of the two columns for a given corresponding record are equal.

In an example process for query content-based data generation described herein, a query is obtained and includes an 'outer' query and one or more subqueries of the outer query. In this regard, an overall "query" can be composed of several discrete queries, one of more of which are subqueries to an 'outer' or 'main' query of the overall query. The process performs subquery transformation as described herein on each subquery of the one or more subqueries and obtains a 'transformed' query. Subquery transformation converts predicates of the one or more subqueries to be predicates of the outer query. Example subquery transformation described herein includes correlated subquery transformation and non-correlated subquery transformation. In addition to subquery transformation, predicate transformation is performed, which includes transformation of dependent predicate(s) and/or transformation of independent predicate(s). Predicate transformation can be performed prior to, or after, a process for query block generation, in which data blocks of the transformed query are 'divided' into one or more lists. Further, constraint-based adjustment and/or query block adjustment may be performed as described herein, followed by data generation from resulting query blocks.

As noted, subquery transformation converts predicate(s) of a subquery to be corresponding predicate(s) of the outer query. Referring back to FIG. 1A, query content 100a (also referred to herein as query 100a) includes portions 102, 104, 106 and 108, which are each subqueries to be transformed in accordance with aspects described herein. Each portion includes respective query predicates for conversion to be predicates of the outer query (SELECT ORDER.order_id FROM ORDER, ORDER2 WHERE . . . ').

With respect to portion 102, it includes predicate ORDER2.ORDER_ID<105, which is an independent predicate, followed by 'AND EXSTS (SELECT 1 FROM . . . '. Referring to FIG. 1B showing partially transformed query 100b, section 102' represents a transformed version of portion 102. In section 102', the 'WHERE ORDER2.ORDER_ID<105 AND EXISTS . . . ' clause is broken down into the predicate ORDER2.ORDER_ID<105 and predicates that are converted from rest of section 102 of FIG. 1A, which are merged to the premise of the outer query.

The WHERE EXISTS clause and operator of section 102 (FIG. 1A) is handled in this example with a subquery transformation in which predicate(s) 'bubble up' to the outer query. The following presents an example of local filtering within a correlated subquery, in which the EXISTS operator results in a merge into the parent query block. Take the following query portion:

```
SELECT T1.*
FROM T1
WHERE EXISTS
    (SELECT 1
    FROM T2
    WHERE T1.SSN = T2.SSN
    AND T2.SSN = '123 45 6789')
```

In this example, the subquery is dependent on table T1. No local filtering is done on the outer table T1 in this example. The WHERE T1.SSN=T2.SSN presents a correlation predicate and the AND T2.SSN='123 45 6789' presents a local predicate on the same column (T1) as the correlation predicate.

This is converted in accordance with aspects described herein by pulling out predicate T1.SSN='123 45 6789' (as T1.SSN=T2.SSN by the correlation predicate) to be a predicate of the outer query (i.e. "AND T1.SSN='123 45 6789'"). T1 then has a local predicate on SSN.

This 'bubble up' is an example of converting predicate(s) of a subquery to be predicate(s) of the outer query. The subquery transformation identifies predicate(s) of the subquery and converts the identified predicate(s) to at least one predicate of the outer query. The subquery can be eliminated at that point such that it does not appear in the transformed query. In the example, converting an identified predicate includes, based on identifying a correlation predicate (e.g. WHERE T1.SSN=T2.SSN), of the subquery, that correlates table columns (i.e. T1.SSN and T2.SSN), converting at least one predicate of the subquery (T2.SSN='123 45 6789') to a local predicate of the outer query (AND T1.SSN='123 45 6789'), the local predicate being on a column (T1.SSN) of the correlated table columns.

Turning again to FIG. 1B, section 102' includes the predicates "AND WAREHOUSE.warehouse_id= DISTRICT2.district_warehouse_id" and "AND WAREHOUSE.warehouse_id=ORDER.order_warehouse_id" which replace the "(SELECT 1 FROM . . . " subquery of section 102 (FIG. 1A).

FIG. 1C, presenting partially transformed query 100c, shows section 104', transformed from section 104 (FIG. 1A), which included the clause "AND DISTRICT2.district_id IN (SELECT CUSTOMER.customer_district_id . . . ". This subquery is transformed into "AND DISTRICT2. district_id=CUSTOMER.customer_district_id" as show in section 104' of FIG. 1C.

Meanwhile, the "WHERE EXISTS . . . " clause of original section 106 (see FIG. 1A) is pulled-out as shown in 106' of FIG. 1C as an "AND EXISTS . . . " clause of the outer query. A transformation on the EXISTS operator of 106' proceeds as described above to produce modified section 106' (see FIG. 1D presenting partially transformed query 100d), in which predicates of the 'EXISTS (SELECT 1 . . . ' subquery have been converted into the following predicates of the outer query as show in in 106' of FIG. 1D: "WAREHOUSE2.warehouse_id=CUSTOMER2.customer_warehouse_id", "CUSTOMER2.customer_district_id= CUSTOMER.customer_district_id", and "CUSTOMER2. customer_district_id=ORDER.order_district_id".

An example transformation transforms a non-correlated subquery using an IN predicate to a 'join'. Below is an example merge of a subquery that uses an IN operator:

```
Before:
    SELECT *
    FROM EMP
    WHERE DEPTNO IN
        ( SELECT DEPTNO FROM DEPT
            WHERE LOCATION IN ('SJ', 'SF')
            AND DIVISION = 'MARKETING')
After:
    SELECT EMP.*
    FROM EMP, DEPT
    WHERE EMP.DEPTNO = DEPT.DEPTNO
        AND DEPT.LOCATION IN ('SJ', 'SF')
        AND DEPT.DIVISION = 'MARKETING'
```

The 'After' query still includes SELECT . . . FROM . . . statement with a WHERE clause but the query is made more simplistic as the subquery has been eliminated. This results in simplified query blocks (see below).

Referring still to FIG. 1D, it is seen that section 108 leads with an OR, which represents an alternative to the predicate set in section 106' of FIG. 1D. The OR and its following predicates are pulled out as predicates of the outer query and the transformation described above with the IN operator is performed to produce the transformed section 108' of FIG. 1E, presenting transformed query 100e. The predicates of section 108 are transformed in accordance with the above to be 'ORDER.ORDER_DISTRICT_ID=ORDER2.ORDER_DISTRICT_ID', 'ORDER.ORDER_CARRIER_ID= ORDER2.ORDER_CARRIER_ID' and 'ORDER2. ORDER_ID<105'.

The OR operator of 108' in FIG. 1E operates as an alternative to the predicates of 106'. Thus, as part of converting predicates of a subquery, the converting converts predicates of a subquery that has an OR operator into a first set of predicates of the transformed query (e.g. in 106') and a second set of predicates of the transformed query (e.g. in 108'), the first set of predicates and the second set of predicates representing alternatives to each other for evaluation of the transformed query.

Accordingly, a process can perform subquery transformation on each subquery of the subqueries if the initial/obtained query (100a) in order to obtain a transformed query (e.g. 100e), in which the subquery transformation converts predicates of the subqueries to be predicates of the outer query. From the transformed subquery, query block(s) may then be generated as described herein, each query block including a list of predicates selected from the transformed query.

Generated from the transformed query (100e of FIG. 1E) from the examples above are two query blocks. Sections 102' and 104' are part of each query block, while sections 106' and 108' represent alternatives to each other for satisfying the query. A process for generating query block(s) can therefore generate a respective query block for each of the alternatives involved.

A query block may be a list of predicates. As noted, two lists/query blocks are generated from the example of FIG. 1E—one block for the first branch (106') of the OR and the other block for the other branch (108') of the OR. The two query blocks in this example are referred to as List0 and List1, and are as follows:

List0:
ORDER2.ORDER_ID<105
DISTRICT2.DISTRICT_WAREHOUSE_ID=ORDER.ORDER_WAREHOUSE_ID
WAREHOUSE.WAREHOUSE_ID=DISTRICT2.DISTRICT_WAREHOUSE_ID
WAREHOUSE.WAREHOUSE_ID=ORDER.ORDER_WAREHOUSE_ID
DISTRICT2.DISTRICT_ID=CUSTOMER.CUSTOMER_DISTRICT_ID
WAREHOUSE2.WAREHOUSE_ID=CUSTOMER2.CUSTOMER_WAREHOUSE_ID
CUSTOMER2.CUSTOMER_DISTRICT_ID=CUSTOMER.CUSTOMER_DISTRICT_ID
CUSTOMER2.CUSTOMER_DISTRICT_ID=ORDER.ORDER_DISTRICT_ID List1:
ORDER2.ORDER_ID<105
DISTRICT2.DISTRICT_WAREHOUSE_ID=ORDER.ORDER_WAREHOUSE_ID
WAREHOUSE.WAREHOUSE_ID=DISTRICT2.DISTRICT_WAREHOUSE_ID
WAREHOUSE.WAREHOUSE_ID=ORDER.ORDER_WAREHOUSE_ID
DISTRICT2.DISTRICT_ID=CUSTOMER.CUSTOMER_DISTRICT_ID
ORDER.ORDER_DISTRICT_ID=ORDER2.ORDER_DISTRICT_ID
ORDER2.ORDER_CARRIER_ID=ORDER.ORDER_CARRIER_ID
ORDER2.ORDER_ID<105

It is seen that the List0 includes the predicates from sections 102', 104', and 106' of FIG. 1E, while List1 includes the predicates from sections 102', 104', and 108' of FIG. 1E.

Table 1 below presents a summary for translating subqueries for various operators. The left column is the operator, the middle column is the 'Before' query and the right column is the 'After', or transformed, query.

TABLE 1

| | | |
|---|---|---|
| IN | AND CITY IN (SELECT CUSTOMER_CITY FROM TB_CUSTOMER_PBR WHERE CUSTOMER_ID < 200) | AND CITY = CUSTOMER_CITY AND CUSTOMER_ID < 200 |
| <= ANY | AND OR.ORDER_SHIP_DATE <= ANY (SELECT ORDER_ESTIMATE_DATE FROM SCJ21101.TB_ORDER_PBG WHERE ) | AND OR.ORDER_SHIP_DATE <= ORDER_ESTIMATE_DATE AND ORDER_ID = OR.ORDER_ID |
| < > SOME | AND ORDER_CARRIER_ID <> SOME (SELECT ORDER_CARRIER_ID FROM TB_ORDER_PBR WHERE ORDER_CREATE_BIGINT1 IS NOT NULL) | AND ORDER_CARRIER_ID <> ORDER_CARRIER_ID AND ORDER_CREATE_BIGINT1 IS NOT NULL |
| EXISTS | AND EXISTS (SELECT * FROM TB_CUSTOMER_PBR WHERE DISTRICT_STATE = CUSTOMER_STATE) | AND DISTRICT_STATE = CUSTOMER_STATE |
| > ALL | AND ORDER_CUSTOMER_ID > ALL (SELECT CUSTOMER_ID FROM TB_CUSTOMER_PBR WHERE CUSTOMER_STATE LIKE 'C%') | AND ORDER_CUSTOMER_ID > ALL CUSTOMER_ID AND CUSTOMER_STATE LIKE 'C%' |

Figure 3:
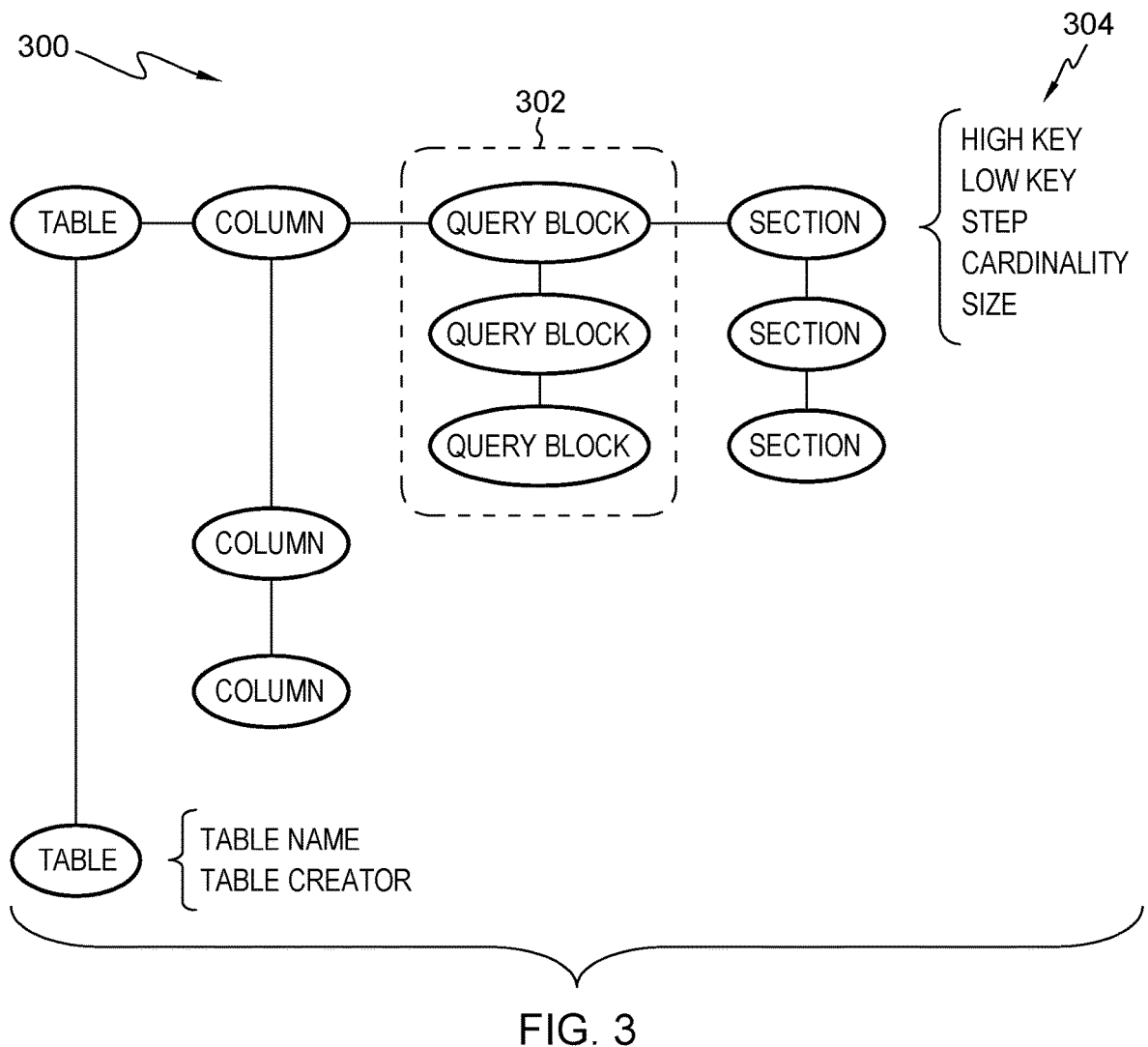
FIG. 3 depicts further details of a conceptual database object layout and data attribute determination for data generation, in accordance with aspects described herein.

FIG. 3 depicts further details of a conceptual database object layout and data attribute determination for data generation, in accordance with aspects described herein. As noted above, the conceptual layout (300) of database objects can include a table (named, and having a creator) which includes column(s). Columns are referenced by one or more query blocks 302. Each query block can be broken into sections as described herein, and each section can inform attributes 304 (may also be referred to as constraints) about data for column(s) of the section. Example column attributes include high key, low key, step, cardinality, and size. These attributes may be used for generating data as described herein.

Figure 4:
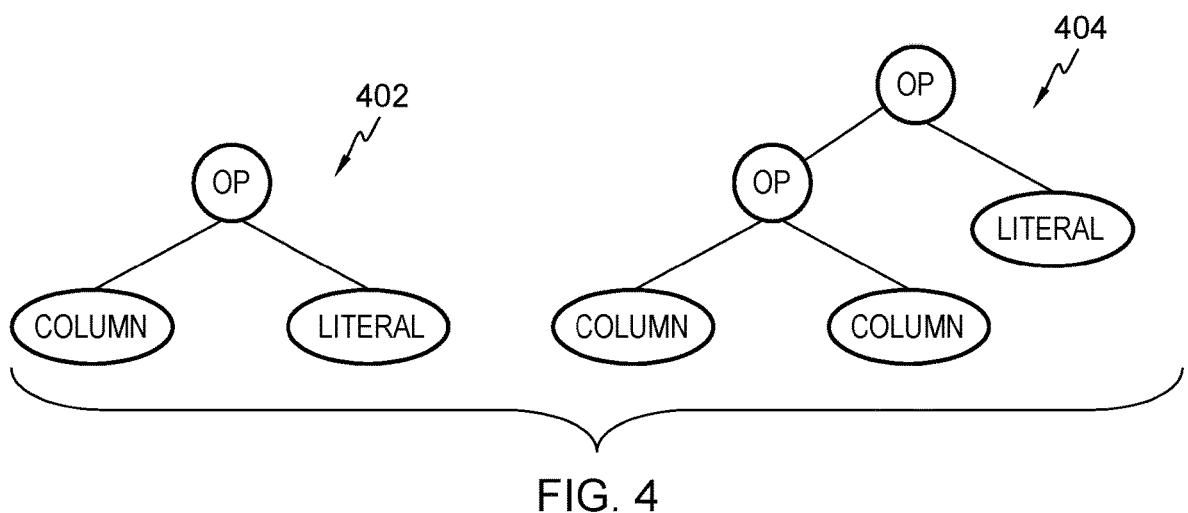
FIG. 4 depicts an example conceptual representation of an independent query predicate and a dependent query predicate.

Prior to, or after, query block generation described above, predicates of the transformed query can themselves be transformed. Predicates can be independent or dependent. FIG. 4 depicts an example conceptual representation of an independent query predicate and a dependent query predicate. Specifically, independent predicate 402 indicates a column, an operand, and a literal. The operand relates column value(s) to the literal. ColumnA>200, for instance, indicates that values in Column A are greater than the literal '200'. Dependent predicate 404 sets forth a dependency or relation between more than one column of data, specifically by relating two columns with an operand, and relating that result to a literal with another operand. Column A−Column B<100, for instance, indicates that the value of Column *A minus* the value of Column B (a relation between the two) is less than literal '100'.

Dependent predicates in the generated query blocks (e.g. List0 and List1 above) can be rewritten into the form that isolates the literal on one side of an equation. For example, the predicate DISTRICT2.DISTRICT_WAREHOUSE_ID=ORDER.ORDER_WAREHOUSE_ID is equivalent to, and can be rewritten as, DISTRICT2.DISTRICT_WAREHOUSE_ID−ORDER.ORDER_WAREHOUSE_ID=0. Thus, as part of processing a query block for column information to generate data, a process can rewrite a predicate referencing multiple columns as an equation predicate relating the multiple columns using a literal such that the literal indicates a relationship between values of the multiple columns referenced by the predicate. In example above, the relationship indicates equality between the two columns using a '0' as the literal.

Using List0 from above, dependent predicate transformation can rewrite the list as:
ORDER2.ORDER_ID<105
DISTRICT2.DISTRICT_WAREHOUSE_ID−ORDER.
  ORDER_WAREHOUSE_ID=0
WAREHOUSE.WAREHOUSE_ID−
  DISTRICT2.DISTRICT_WAREHOUSE_ID=0
WAREHOUSE.WAREHOUSE_ID−ORDER.ORDER_
  WAREHOUSE_ID=0
DISTRICT2.DISTRICT_ID−CUSTOMER.CUSTOM-
  ER_DISTRICT_ID=0
WAREHOUSE2.WAREHOUSE_ID−
  CUSTOMER2.CUSTOMER_WAREHOUSE_ID=0
CUSTOMER2.CUSTOMER_DISTRICT_ID−CUSTO-
  MER.CUSTOMER_DISTRICT_ID=0
CUSTOMER2.CUSTOMER_DISTRICT_ID−ORDER.
  ORDER_DISTRICT_ID=0

Predicate transformation can be used in setting up a query block for processing to determine column information based on the list of predicates in that query block. The column information can include column range information and column relationship information, for instance.

Processing for column information from an independent predicate can be straight-forward. Take the independent predicate ORDER2.ORDER_ID>105. An attribute of column ORDER_ID of table ORDER2 is that the low key is 106 (assuming integer or similar values in which the step between values is 1). This predicate alone does not inform of a high key for the column.

Dependent predicates relate columns, and therefore a collection of predicates informing of relation(s) a given column has to other columns can be useful in figuring out how column values relate to each other. Thus, part of processing a query block for column information can include grouping dependent predicates of the query block into predicate groups, where each predicate group includes dependent predicates that reference a respective common set of columns, such that each column referenced by any of the grouped dependent predicates of the query block is referenced only by dependent predicates in one of the predicate groups. In other words, this groups together predicates that together reference a common group of columns that does not overlap with the columns referenced by any of the other groups. A goal of this is to isolate each column to a single group. A given column should not be set-forth in dependent predicates across two or more groups.

Again using the example of List0 from above, the dependent predicates in the List0 are processed and grouped into three groups.

Group1 includes predicates:
DISTRICT2.DISTRICT_WAREHOUSE_ID−ORDER.
  ORDER_WAREHOUSE_ID=0
WAREHOUSE.WAREHOUSE_ID−
  DISTRICT2.DISTRICT_WAREHOUSE_ID=0
WAREHOUSE.WAREHOUSE_ID−ORDER.ORDER_
  WAREHOUSE_ID=0

There are three dependent predicates in this group, and the three predicates form a closed group in terms of the columns referenced—DISTRICT2.DISTRICT_WAREHOUSE_ID, ORDER.ORDER_WAREHOUSE_ID, and WAREHOUSE.WAREHOUSE_ID.

Group2 includes predicate WAREHOUSE2.WAREHOUSE_ID−CUSTOMER2.CUSTOMER_WAREHOUSE_ID=0, which stands alone because there is no relationship of this predicate to any of the other predicates in the List0. The columns involved in this predicate do not have a relationship to any other column referred to in the other predicates of the List0.

Group3 includes predicates:
DISTRICT2.DISTRICT_ID−CUSTOMER.CUSTOM-
  ER_DISTRICT_ID=0
CUSTOMER2.CUSTOMER_DISTRICT_ID−CUSTO-
  MER.CUSTOMER_DISTRICT_ID=0
CUSTOMER2.CUSTOMER_DISTRICT_ID−ORDER.
  ORDER_DISTRICT_ID=0

There are three dependent predicates in this group, and the three predicates form a closed group in terms of the columns referenced–DISTRICT2.DISTRICT_ID, CUSTOMER.CUSTOMER_DISTRICT_ID, CUSTOMER2.CUSTOMER_DISTRICT_ID, and ORDER.ORDER_DISTRICT_ID.

Figure 5:
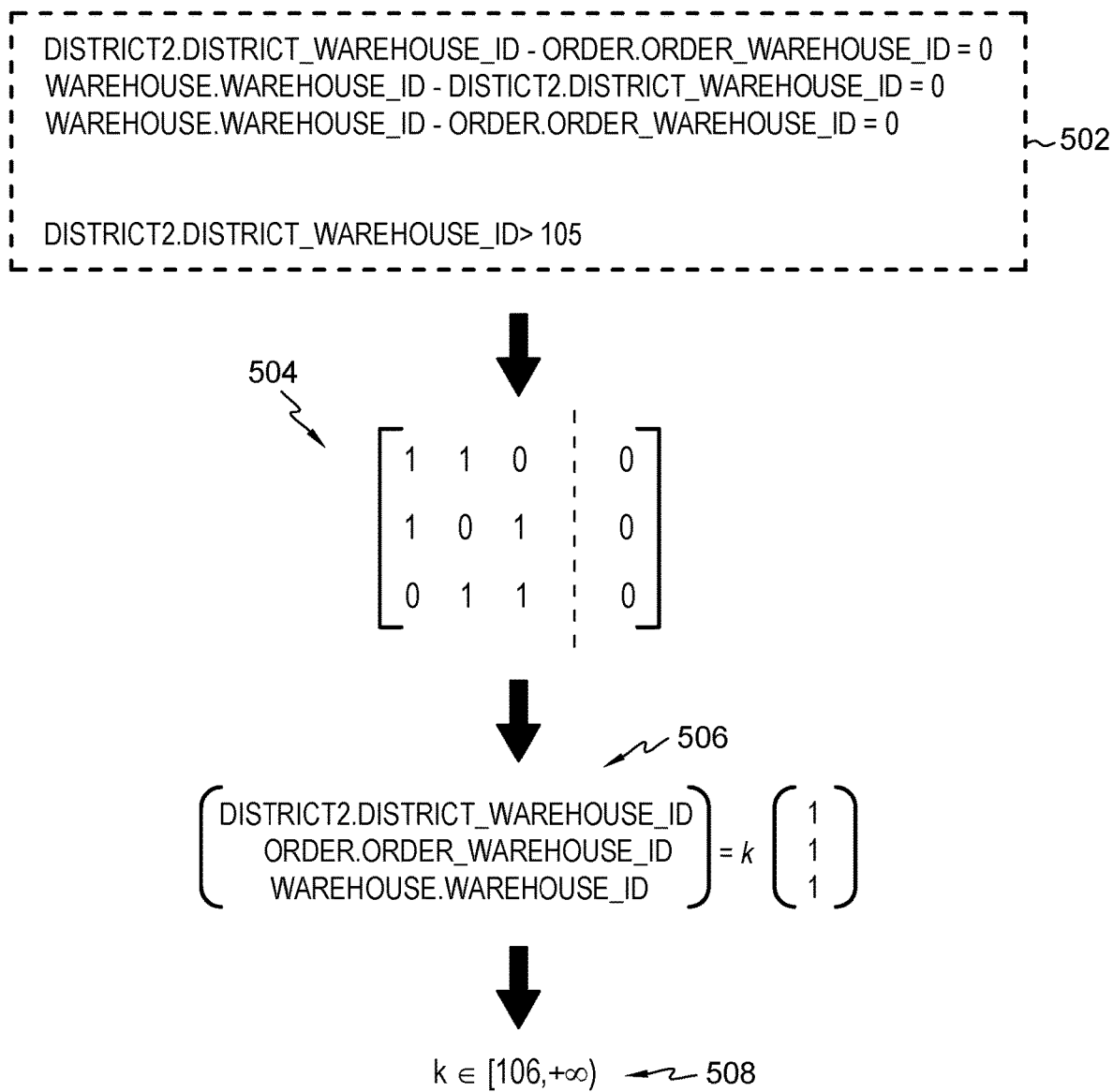
FIG. 5 depicts a conceptual example of predicate relationship analysis for column information, in accordance with aspects described herein.

Each of the column groups of dependent predicates can be analyzed for column information using predicate relationship analysis. FIG. 5 depicts a conceptual example of predicate relationship analysis for column information, in accordance with aspects described herein.

Column Group1 above includes dependent predicates:
DISTRICT2.DISTRICT_WAREHOUSE_ID−ORDER.
  ORDER_WAREHOUSE_ID=0
WAREHOUSE.WAREHOUSE_ID−
  DISTRICT2.DISTRICT_WAREHOUSE_ID=0
WAREHOUSE.WAREHOUSE_ID−ORDER.ORDER_
  WAREHOUSE_ID=0.

Independent predicate(s) informing about a column of a column group also applies to that column group. Assume by way of example that an independent predicate of the query block states that DISTRICT2.DISTRICT_WAREHOUSE_ID>105.

Thus, referring to FIG. 5, the set of four predicates for column Group1 are shown in in box 502. The first three predicates are the dependent predicates. In accordance with aspects of the predicate relationship analysis, a linear matrix 504 is constructed to relate the three columns referenced in the three dependent predicates. The first column of the matrix corresponds to DISTRICT2.DISTRICT_WAREHOUSE_ID, the second column of the matric corresponds to ORDER.ORDER_WAREHOUSE_ID, and the third column of the matrix corresponds to WAREHOUSE.WAREHOUSE_ID. The last column in this example indicates the relation between the two columns indicated in each row. A '0' indicates equality, as the dependent predicates indicate that ColA−ColB=0.

The linear matrix is converted into a relationship vector 506 that relates all three columns relative to a k constraint. The k constraint here is the constrained value of DISTRICT2.DISTRICT_WAREHOUSE_ID from the independent predicate, indicating that DISTRICT_WAREHOUSE_ID>105. This predicate informs some column range information based on the relation of the column DISTRICT_WAREHOUSE_ID to the literal 105 using the 'greater than' operand. Here, it informs a low key of 106 for DISTRICT_WAREHOUSE_ID. DISTRICT_WAREHOUSE_ID can therefore include values of 106 or greater (see constraint 508). The vector (1,1,1) of 506 presents the relationship between the column values for a given k. The value for columns DISTRICT2.DISTRICT_WAREHOUSE_ID, ORDER.ORDER_WAREHOUSE_ID, and WAREHOUSE.WAREHOUSE_ID are each k*1 for any chose k. This makes sense, as the three predicates above indicate that all three are equal. Whatever k greater than 106 is chosen, the column value for each of the three columns is k*1.

Figure 8:
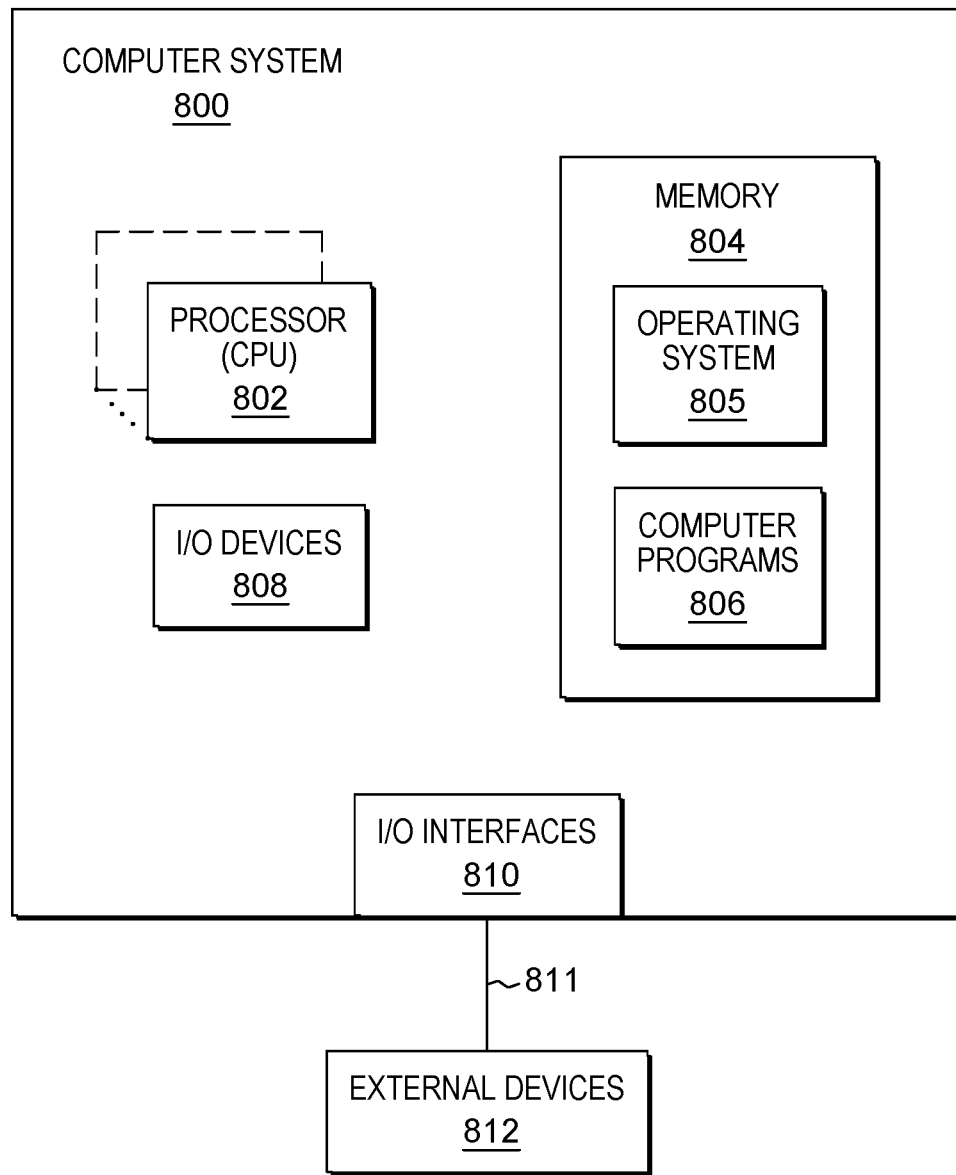
FIG. 8 depicts one example of a computer system and associated devices to incorporate and/or use aspects described herein.

The example of FIG. 8 presents a relatively basic example. In practical applications, the linear matrix may be more complex, resulting in a more complex relationship vector.

The equation predicates inform equivalency in column attributes between columns indicates as equal. DISTRICT2.DISTRICT_WAREHOUSE_ID−ORDER.ORDER_WAREHOUSE_ID=0 indicates that attribute(s) for DISTRICT2.DISTRICT_WAREHOUSE_ID, for instance that the low key=106, applies to the ORDER.ORDER_WAREHOUSE_ID column as well. In other words, a constraint on DISTRICT2.DISTRICT_WAREHOUSE_ID implies the same constraint on ORDER.ORDER_WAREHOUSE_ID, again because they were indicated as being equal. If instead ORDER.ORDER_WAREHOUSE_ID were double DISTRICT2.DISTRICT_WAREHOUSE_ID (i.e. 2*DISTRICT2.DISTRICT_WAREHOUSE_ID=ORDER.ORDER_WAREHOUSE_ID, then the low key of ORDER.ORDER_WAREHOUSE_ID would be 212.

Example attributes include high key, low key, step, cardinality, and size. Cardinality can refer to the uniqueness of values in a column, e.g. how many different values are to be generated for the set of values of the column. A lower cardinality indicates a greater number of duplicated values than a higher cardinality. The size attribute may be something an administrator or other user defines for the size/length of the column. It may refer to a total number of values to generate for the column, for instance. Step can refer to the step size between unique values of the key range. For instance, a step size of 1 can refer to integer values. Using the example of DISTRICT2.DISTRICT_WAREHOUSE_ID with a low key of 106, a step of 1 would indicate that values 106, 107, 108, etc. are value for column DISTRICT2.DISTRICT_WAREHOUSE_ID.

Inequation predicate relationship analyzing and handling can be similar to the above. An inequation predicate refers to one that relates values using an inequality operator, for instance when the value of one column is greater than the value of another column for a given record. As part of processing a query block for column information, rewriting a predicate referencing multiple columns as an equation predicate relating the multiple columns using a literal can include rewriting the inequality relationship, e.g. X>Y, as an equation predicate, e.g. X=Y+literal). Thus, the predicate DISTRICT2.DISTRICT_WAREHOUSE_ID>CUSTOMER2.CUSTOMER_DISTRICT_ID can be rewritten as DISTRICT2.DISTRICT_WAREHOUSE_ID=CUSTOMER2.CUSTOMER_DISTRICT_ID+X. In conjunction with the independent predicate above indicating that DISTRICT2.DISTRICT_WAREHOUSE_ID>105, Then the column information for CUSTOMER2.CUSTOMER_DISTRICT_ID would indicate that the High key of CUSTOMER2.CUSTOMER_DISTRICT_ID is 105.

If an inequality is part of a column group, the relationship vector generation involving a linear matrix discussed above can be performed as above except that an 'X' may be selected before generating the relationship vector. In fact, multiple different X's would be selected to generate appropriate relationship vectors.

Aspects of query block adjustment are discussed with reference to the following query SELECT*FROM T1s
WHERE C1 IN
(SELECT C2 FROM T1
WHERE C2>10 AND
C3<'H')
AND C1<100
AND C3>'H'

Query blocks provide some givens or truths about column values, and column rows should be 'aligned' so that retrieval of a record obtains the proper values from each of the involved columns. If for DISTRICT2.DISTRICT_WAREHOUSE_ID (which has a low key of 106) the value in row 1 of the column is 106, then the value in row 1 of ORDER.ORDER_WAREHOUSE_ID is to be 106. Similarly, if 100 values are generated for column DISTRICT2.DISTRICT_WAREHOUSE_ID, then 100 values are to be generated for column ORDER.ORDER_WAREHOUSE_ID.

The above query can be broken into two query blocks. C1 represents column 1, C2 represents column2, and C3 represents column 3. The first query block indicates that 10<C1<100 and C3>'H' (with no information about C2), and the second query block indicates that 10<C2<10 and C3<'H' (with no information about C1). In query block 1, when 10<C1<100 then C3>'H' and there are no constraints on C2. In this case, random numbers could be inserted for those values of C2. However, the inserted numbers are not to be between 10 and 100 because that case is handled by query block 2 where C3<'H'. With respect to query block 2, random numbers could be inserted for values of C1 however, again, these are not to be between 10 and 100 as that range is covered by query block 1.

With the constraints established and relationship vector(s) determined, the process can generate appropriate data and populate a dataset including one or more tables and a respective one or more columns for each of the one of more tables. Generating the data uses the column range information and the column relationship information identified above to select data for the dataset such that data records from the dataset are produced as results to executing the particular query that was transformed and analyzed as described above against the generated dataset of data.

In this regard, a data producer component can operate in any desired manner to generate the data consistent with the predicates analyzed. In some embodiments, a user specifies a data scale for the result set and/or table size. The data producer can dynamically adjust depending on the relation calculations.

The low key can indicate a 'start value' for a column and the high key can indicate an end value. Step indicates a step or distance between consecutive values in a range. As noted, cardinality refers to uniqueness of the values in the column. For the Integer data type, if starting from 1 and ending at 100, there are 100 different values at most, and cardinality can be 100 (at most). In some examples, cardinality and/or size are column attributes/constraints that can be defined by an administrator or other user.

In addition, a validation engine could validate data generated and save the proper data as new file(s)

In an example specific process including phases (not necessarily in this order), a phase 1 includes data type sorting that iterates through a group of predicates to sort the predicates into string data types (e.g. CHAR and VARCHAR as examples), numeral data types (e.g. Integer, Decimal, Float, Double, and Long, as examples), and other data types (e.g. Timestamp, and Date as examples). A phase 2 includes predicate transformation that attempts to transform predicates to the general form T1.C1 [+/−] T2. C2 OP C, where T1.C1 is column C1 of Table T1, T2.C2 is column C2 of table T2, OP is an operand, and C is a constant. A phase 3 includes predicate sorting to sort predicates into independent predicates and dependent predicates. Independent predicates contain one column element, while the dependent predicates contain two or more column elements. Dependent predicates can be partitioned between the predicate's operator, such that the equation and inequation portions are identified, and equations are grouped into subparts (groups) in which the predicates correlate to each other for identifying relationship vectors between correlated columns. A phase 4 include predicate handling in which, depending on a column's data type, numerical data types can be solved using range and string data types can be set to a single value. Range in that case can be the set of many single values. A phase 5 can include result adjusting, in which, after obtaining the range indicated by each predicate, the relation among columns is considered. For example, a join relation, a partition key constraint and the setting values or range for some columns that are not in the SQL's predicates are considered. In a phase 6, an XML file is generated, in which each column's result is saved using any desired internal structure but then rewritten to a file of the XML format.

Generating the data can account for one or more constraints on database object definitions. The one or more constraints can include, for instance, one or more CHECK constraints, one or more unique index constraints, and/or one or more foreign key constraints, as examples.

A check constraint is sometimes used in custom DDL. As an example, the following can be defined in the DDL:
 CREATE TABLE EMPSAL
 (ID INTEGER NOT NULL,
 SALARY INTEGER CHECK (SALARY>=15000));

This check constraint can be implemented as one or more independent predicates, for instance SALARY>=15000, added to each query block list.

In dealing with indexes, it may be desired to ascertain a unique value for each index.

Table 2 below presents an example summary of indexes for a database:

TABLE 2

| Index Name | Column Name | Column Sequence | Column Number | Column Count |
|---|---|---|---|---|
| 18 | NUBC_PAT_STAT_CD | 1 | 35 | 1 |
| 19 | NUBC_ADMIT_SRC_CD | 1 | 24 | 1 |
| 22 | NUBC_ADMIT_TYPE_CD | 1 | 15 | 1 |

TABLE 2-continued

| Index Name | Column Name | Column Sequence | Column Number | Column Count |
|---|---|---|---|---|
| 14 | INTERNAL_CLAIM_ID | 1 | 5 | 2 |
|  | HDR_LST_PROCESS_DT | 2 | 11 | 2 |
| 13 | HDR_LST_PROCESS_DT | 1 | 11 | 2 |
|  | CLM_HEADER_SK | 2 | 2 | 2 |
| 16 | CLM_HEADER_SK | 1 | 2 | 3 |
|  | NUBC_ADMIT_TYPE_CD | 2 | 15 | 3 |
|  | PROCESSED_MLT | 3 | 160 | 3 |
| 12 | HDR_LST_PROCESS_DT | 1 | 11 | 3 |
|  | SRC_TYPE_CD | 2 | 7 | 3 |
|  | CLM_LINE_SK | 3 | 1 | 3 |

Indexes on one column may not problematic, but indexes with more than one column could be. Indexes 18, 19 and 22 in the above Table 2 each refer to only one column. The other indexes (14, 13, 16, 12) include more than one column. Therefore, the process could identify indexes with more than one column for different tables, order these by a number of columns in the indexes (as above) and build an index group for each table. A primary key is selected as a unique index, and an index to use in an SQL join is selected. In the above table, Index 14 may be selected, which indexes column HDR_LST_PROCESS_DT. Since Index 13 indexes that column, Index 13 is eliminated. Similarly, Index 12 indexes that column, and it is eliminated. Index 16 indexes columns that are not already indexed by another selected Index, and therefore index 16 is not eliminated. What remains from the original Table 2 is indexes 18, 19, 22, 14, and 16. These 5 indexes may be generated with the generated dataset.

Foreign key constraints and information can dictate the order in which columns are generated. Generating the data can therefore account for one or more foreign key constraints. In some examples, foreign key relationships may result in a cyclic relationship between columns. Accounting for these foreign key relationships can include identifying and resolving a cycle in a foreign key relationship chain between columns and using the result to identify an order in which to generate data for multiple columns of the dataset.

Foreign key constraints are common in DDL. An example process identifies an insert order for an index, detect any foreign key cycle problems, and builds the appropriate foreign key relationship(s) in generating data.

Figure 6:
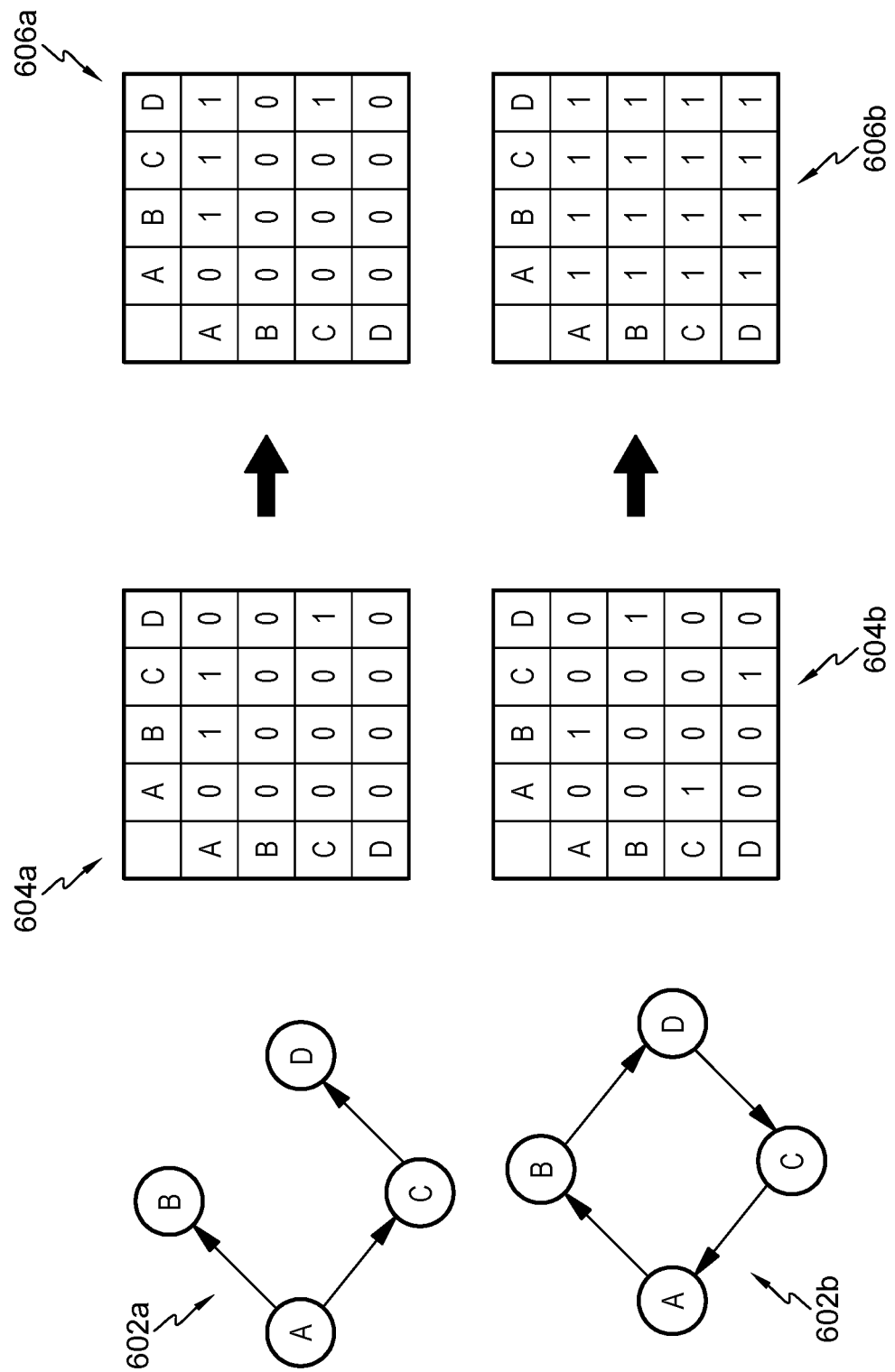
FIG. 6 depicts an example representing a foreign key constraint for foreign key cycle resolution, in accordance with aspects described herein.

FIG. 6 depicts an example representing a foreign key constraint for foreign key cycle resolution, in accordance with aspects described herein.

Foreign key relationship diagram 602a presents a situation where column A is a foreign key to column B (e.g. when inserting a value into column B, the appropriate value should exist in column A) and also to column C, while column C is a foreign key to column D. Relationship grid 604a presents the direct foreign key relationships (represented by a '1') ascertained from 602a, namely that column A is the direct foreign key to columns B and C and column C is the direct foreign key to column D. Relationship grid 606a includes the indirect foreign key relationships, namely, in addition to the relationships indicated by grid 604a, that column A is indirectly the foreign key to column D, since A is foreign key to C and C is foreign key to D.

Foreign key relationship diagram 602b presents a situation where there is a foreign key cycle. Column A is a foreign key to column B, which is a foreign key to column C, which is a foreign key to column D, which is a foreign key to column A. Relationship grid 604b presents the direct foreign key relationships and relationship grid 606b includes the indirect foreign key relationships. Here, a cycle is indicated because there are '1's down the diagonal from column A-row A to column D-row D. To handle this, an edge (e.g. representative of one of the foreign key relationships) between columns is removed to resolve the cycle. Revolving the cycle enables the data generation component/process to perform the data inserts in a proper order. Removing the edge between column D and C, for instance, would dictate that values of column C are generated first, followed by values of column A, then values of column B, then values of column D.

Accordingly, a process for data generation includes dynamically analyzing DDL & query content to inform the generation of data to produce query results. This can leverage subquery transformation with, e.g., predicate bubble-up and predicate analysis for group-wise analyzing column relationships, followed by data generation using query blocks and accounting for constraints on the data/database objects.

Query content-based data generation can help to improve (lower) response time for database troubleshooting and testing cases, which can help reduce any business loss resulting from problematic queries. It can also reduce resource consumption, such as developer time spent recreating query problems when quality data is not available. It also provides improved database quality, as it expands the ability to test real queries against generated datasets, for instance ones placed online, in an effort to verify that the such online infrastructure can properly host the database to handle queries correctly. Meanwhile, there are no data security issues as, e.g., customers will not need to share their data (it instead could be generated).

Figure 7:
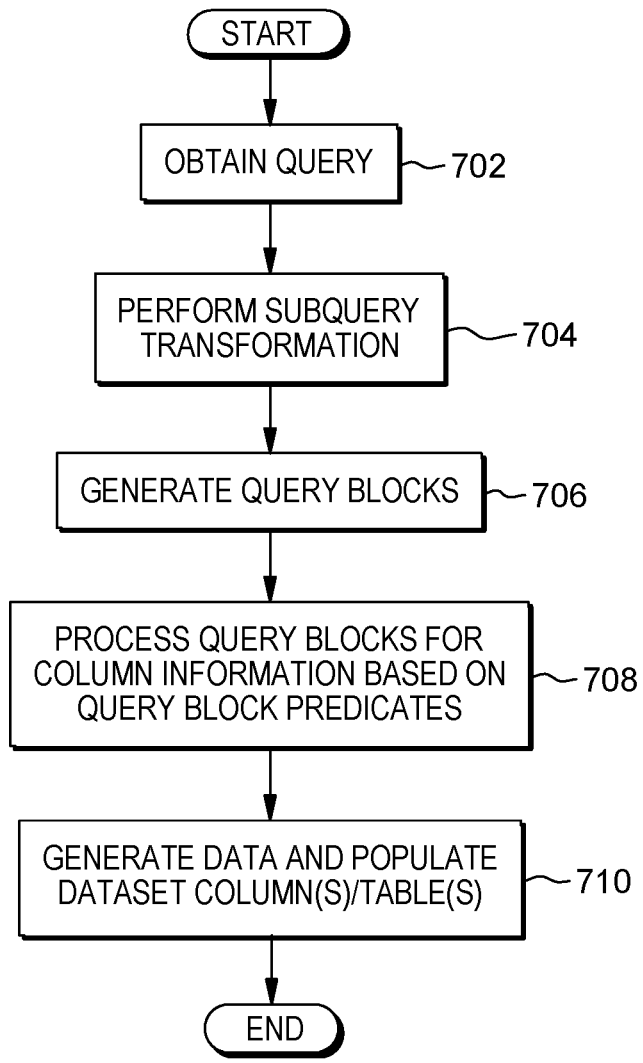
FIG. 7 depicts example processes for query content-based data generation, in accordance with aspects described herein.

FIG. 7 depicts example processes for query-based data generation, in accordance with aspects described herein. In some examples, the process is performed by one or more computer systems, such as those described herein.

The process begins by obtaining (702) a query. The query includes an outer query and one or more subqueries of the outer query. it may be that the query. The process also performs (704) subquery transformation on each subquery of the one or more subqueries to obtain a transformed query. The subquery transformation converts predicates of the one or more subqueries to be predicates of the outer query. In some examples, the subquery transformation on a subquery of the one or more subqueries includes identifying one or more predicates of the subquery, converting the identified one or more predicates to at least one predicate of the outer query, and eliminating the subquery such that it does not appear in the transformed query. Converting an identified predicate of the identified one or more predicates can include, for instance, based on identifying a correlation predicate, of the subquery, that correlates table columns, converting at least one predicate of the subquery to a local predicate of the outer query, the local predicate being on a column of the correlated table columns.

The process of FIG. 7 can also generate (706) from the transformed query one or more query blocks or predicate lists, each including a list of predicates selected from the transformed query. In cases where the converting of (of 704) converts predicates of a subquery, of the one or more subqueries, having an OR operator into a first set of predicates of the transformed query and a second set of predicates of the transformed query, the first set of predicates and the second set of predicates representing alternatives to each other for evaluation of the transformed query, the generating the one or more query blocks can generate a respective query block for each of the alternatives. The process also processes (708) each query block of the one or more query blocks for column information based on the list of predicates of that query block. The column information can include column range information and column relationship information. Column range information can inform of range(s) of values to be inserted in columns. Column relationship information can inform of relationships between values of columns, for instance values of related rows/records of the columns.

In some examples, processing a query block for column information includes rewriting a predicate, such as a dependent predicated, that references multiple columns as an equation predicate relating the multiple columns using a literal. The literal can indicate a relationship between values of the multiple columns referenced by the predicate. The relationship can indicate equality between the multiple columns or indicate inequality between the multiple columns by some magnitude.

Additionally or alternatively, processing a query block for column information can include grouping predicates of the query block into predicate groups, each predicate group including predicates that reference a respective common set of columns. Thus, each/any column referenced by any of the grouped predicates of the query block is referenced only by predicate(s) in one of the predicate groups. Processing the query block can also include in this example determining, based on predicates grouped into a predicate group of the predicate groups, a relationship vector that defines a relationship between values of columns referenced by the predicates grouped into that predicate group.

Processing a query block for column information can include extracting column range information from a predicate that relates a column to a literal using an operand, the column range information being at least one selected from the group consisting of: a high key and a low key for that column.

The process of FIG. 7 also includes generating (710) data and populating a dataset. The dataset can include one or more tables, and a respective one or more columns for each of the one of more tables. Generating the data uses the column range information and the column relationship information to select data for the dataset such that data records from the dataset are produced as results to executing the obtained query against the dataset. In some examples, generating the data accounts for one or more constraints on database object definitions, such as a CHECK constraint, a unique index constraint, and/or a foreign key constraint. Generating the data could, for instance, account for a foreign key constraint by identifying and resolving a cycle in a foreign key relationship chain between columns, to identify an order in which to generate data for multiple columns of the dataset.

Although various examples are provided, variations are possible without departing from a spirit of the claimed aspects.

Processes described herein may be performed singly or collectively by one or more computer systems. FIG. 8 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 8 shows a computer system 800 in communication with external device(s) 812. Computer system 800 includes one or more processor(s) 802, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 802 can also include register(s) to be used by one or more of the functional components. Computer system 800 also includes memory 804, input/output (I/O) devices 808, and I/O interfaces 810, which may be coupled to processor(s) 802 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 804 can be or include main or system memory (e.g. Random Access Memory) used in the execution of program instructions, storage device(s) such as hard drive(s), flash media, or optical media as examples, and/or cache memory, as examples. Memory 804 can include, for instance, a cache, such as a shared cache, which may be coupled to local caches (examples include L1 cache, L2 cache, etc.) of processor(s) 802. Additionally, memory 804 may be or include at least one computer program product having a set (e.g., at least one) of program modules, instructions, code or the like that is/are configured to carry out functions of embodiments described herein when executed by one or more processors.

Memory 804 can store an operating system 805 and other computer programs 806, such as one or more computer programs/applications that execute to perform aspects described herein. Specifically, programs/applications can include computer readable program instructions that may be configured to carry out functions of embodiments of aspects described herein.

Examples of I/O devices 808 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (812) coupled to the computer system through one or more I/O interfaces 810.

Computer system 800 may communicate with one or more external devices 812 via one or more I/O interfaces 810. Example external devices include a keyboard, a pointing device, a display, and/or any other devices that enable a user to interact with computer system 800. Other example external devices include any device that enables computer system 800 to communicate with one or more other computing systems or peripheral devices such as a printer. A network interface/adapter is an example I/O interface that enables computer system 800 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 810 and external devices 812 can occur across wired and/or wireless communications link(s) 811, such as Ethernet-based wired or wireless connections. Example wireless connections include cellular, Wi-Fi, Bluetooth®, proximity-based, near-field, or other types of wireless connections. More generally, communications link(s) 811 may be any appropriate wireless and/or wired communication link(s) for communicating data.

Particular external device(s) 812 may include one or more data storage devices, which may store one or more programs, one or more computer readable program instructions, and/or data, etc. Computer system 800 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 800 may be operational with numerous other general purpose or special purpose computing system environments or configurations. Computer system 800 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
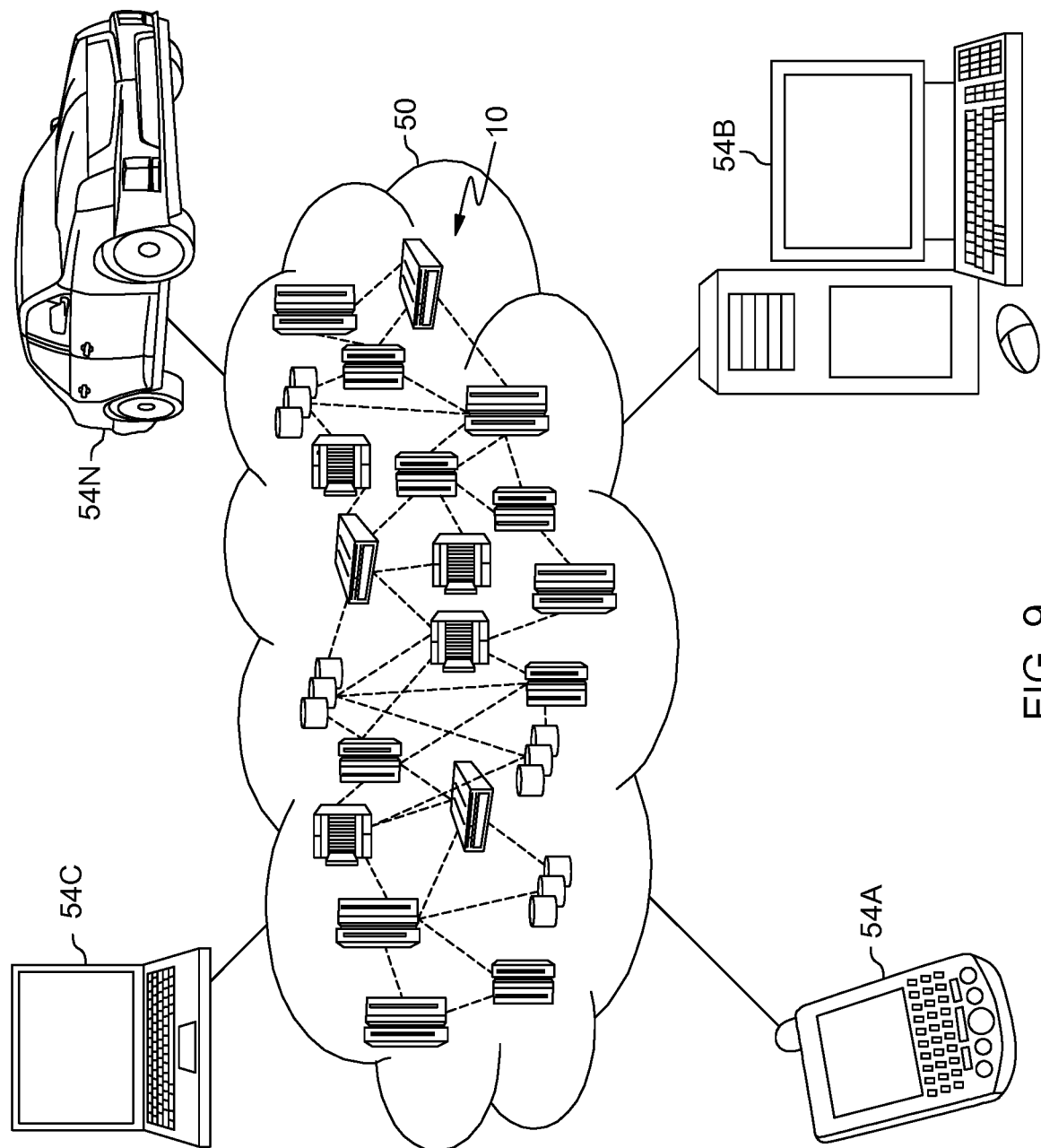
FIG. 9 depicts a cloud computing environment according to an embodiment of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
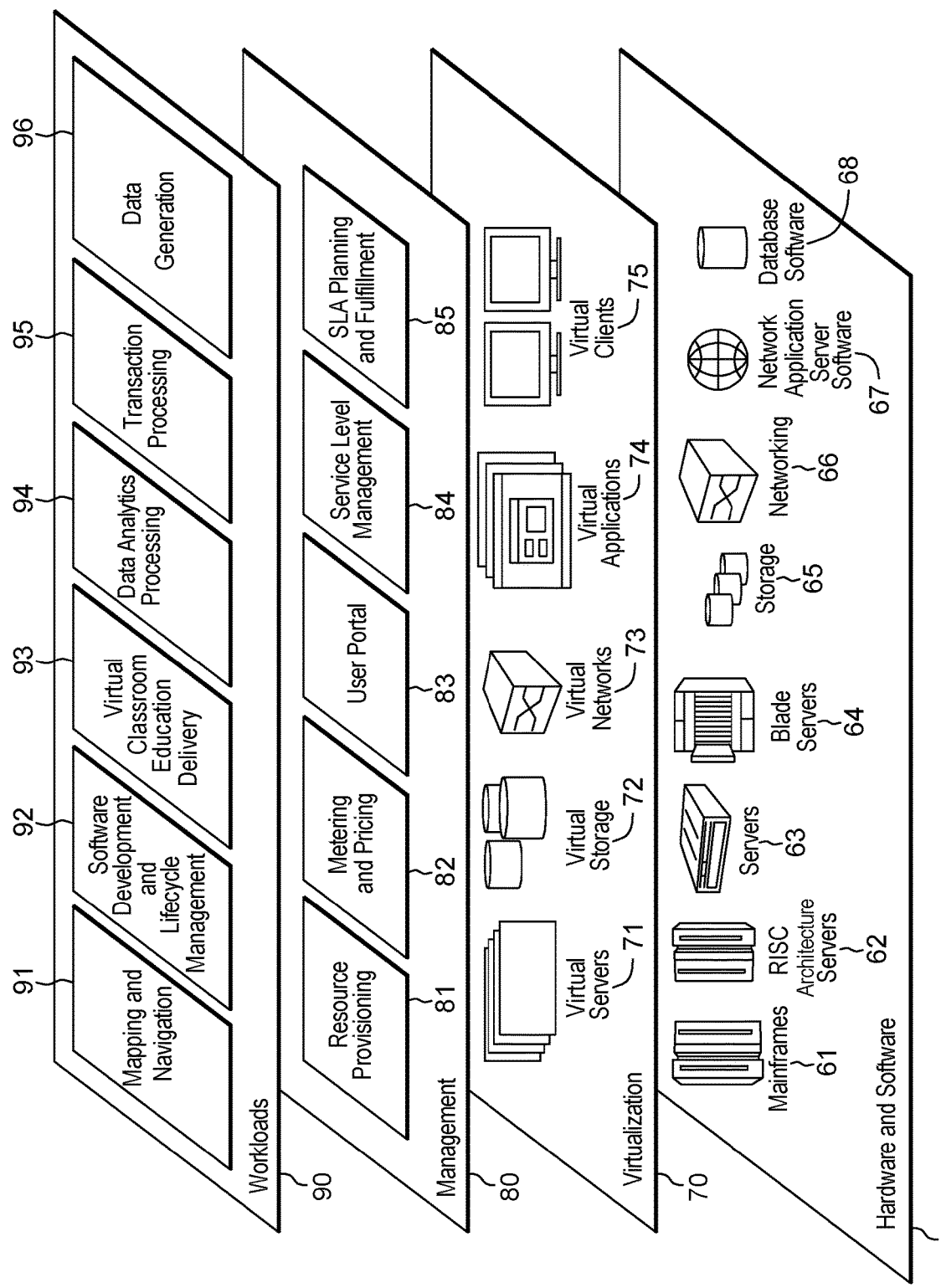
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data generation 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A method comprising:
   obtaining a query, the query comprising an outer query and one or more subqueries of the outer query;
   performing subquery transformation on each subquery of the one or more subqueries to obtain a transformed query, the subquery transformation converting predicates of the one or more subqueries to be predicates of the outer query;
   generating from the transformed query one or more query blocks each comprising a list of predicates selected from the transformed query;
   processing each query block of the one or more query blocks for column information based on the list of predicates of that query block, the column information comprising column range information and column relationship information;
   generating data and populating a dataset comprising one or more tables and a respective one or more columns for each of the one of more tables, wherein generating the data uses the column range information and the column relationship information to select data for the dataset such that data records from the dataset are produced as results to executing the obtained query against the dataset.

2. The method of claim 1, wherein the subquery transformation on a subquery of the one or more subqueries comprises:
   identifying one or more predicates of the subquery;
   converting the identified one or more predicates to at least one predicate of the outer query; and
   eliminating the subquery such that it does not appear in the transformed query.

3. The method of claim 2, wherein converting an identified predicate of the identified one or more predicates comprises: based on identifying a correlation predicate, of the subquery, that correlates table columns, converting at least one predicate of the subquery to a local predicate of the outer query, the local predicate being on a column of the correlated table columns.

4. The method of claim 1, wherein the converting converts predicates of a subquery, of the one or more subqueries, having an OR operator into a first set of predicates of the transformed query and a second set of predicates of the transformed query, the first set of predicates and the second set of predicates representing alternatives to each other for evaluation of the transformed query, and wherein the generating the one or more query blocks generates a respective query block for each of the alternatives.

5. The method of claim 1, wherein processing a query block for column information comprises rewriting a predicate referencing multiple columns as an equation predicate relating the multiple columns using a literal, wherein the literal indicates a relationship between values of the multiple columns referenced by the predicate.

6. The method of claim 5, wherein the relationship indicates equality between the multiple columns or wherein the relationship indicates inequality between the multiple columns by some magnitude.

7. The method of claim 1, wherein processing a query block for column information comprises:
   grouping predicates of the query block into predicate groups, each predicate group comprising predicates that reference a respective common set of columns, such that each column referenced by any of the grouped predicates of the query block is referenced only by predicates in one of the predicate groups; and determining, based on predicates grouped into a predicate group of the predicate groups, a relationship vector that defines a relationship between values of columns referenced by the predicates grouped into that predicate group.

8. The method of claim 1, wherein processing a query block for column information comprises extracting column range information from a predicate that relates a column to a literal using an operand, the column range information being at least one selected from the group consisting of: a high key and a low key for that column.

9. The method of claim 1, wherein generating the data accounts for one or more constraints on database object definitions, the one or more constraints comprising at least one selected from the group consisting of: a CHECK constraint, a unique index constraint, and a foreign key constraint.

10. The method of claim 9, wherein generating the data accounts for a foreign key constraint by identifying and resolving a cycle in a foreign key relationship chain between columns, to identify an order in which to generate data for multiple columns of the dataset.

11. A computer system comprising:
a memory; and
a processor in communication with the memory, wherein the computer system is configured to perform a method comprising:
obtaining a query, the query comprising an outer query and one or more subqueries of the outer query;
performing subquery transformation on each subquery of the one or more subqueries to obtain a transformed query, the subquery transformation converting predicates of the one or more subqueries to be predicates of the outer query;
generating from the transformed query one or more query blocks each comprising a list of predicates selected from the transformed query;
processing each query block of the one or more query blocks for column information based on the list of predicates of that query block, the column information comprising column range information and column relationship information;
generating data and populating a dataset comprising one or more tables and a respective one or more columns for each of the one of more tables, wherein generating the data uses the column range information and the column relationship information to select data for the dataset such that data records from the dataset are produced as results to executing the obtained query against the dataset.

12. The computer system of claim 11, wherein the subquery transformation on a subquery of the one or more subqueries comprises:
identifying one or more predicates of the subquery;
converting the identified one or more predicates to at least one predicate of the outer query; and
eliminating the subquery such that it does not appear in the transformed query.

13. The computer system of claim 12, wherein converting an identified predicate of the identified one or more predicates comprises: based on identifying a correlation predicate, of the subquery, that correlates table columns, converting at least one predicate of the subquery to a local predicate of the outer query, the local predicate being on a column of the correlated table columns.

14. The computer system of claim 11, wherein processing a query block for column information comprises rewriting a predicate referencing multiple columns as an equation predicate relating the multiple columns using a literal, wherein the literal indicates a relationship between values of the multiple columns referenced by the predicate.

15. The computer system of claim 11, wherein processing a query block for column information comprises:
grouping predicates of the query block into predicate groups, each predicate group comprising predicates that reference a respective common set of columns, such that each column referenced by any of the grouped predicates of the query block is referenced only by predicates in one of the predicate groups; and
determining, based on predicates grouped into a predicate group of the predicate groups, a relationship vector that defines a relationship between values of columns referenced by the predicates grouped into that predicate group.

16. The computer system of claim 11, wherein processing a query block for column information comprises extracting column range information from a predicate that relates a column to a literal using an operand, the column range information being at least one selected from the group consisting of: a high key and a low key for that column.

17. A computer program product comprising:
a computer readable storage medium readable by a processing circuit and storing instructions for execution by the processing circuit for performing a method comprising:
obtaining a query, the query comprising an outer query and one or more subqueries of the outer query;
performing subquery transformation on each subquery of the one or more subqueries to obtain a transformed query, the subquery transformation converting predicates of the one or more subqueries to be predicates of the outer query;
generating from the transformed query one or more query blocks each comprising a list of predicates selected from the transformed query;
processing each query block of the one or more query blocks for column information based on the list of predicates of that query block, the column information comprising column range information and column relationship information;
generating data and populating a dataset comprising one or more tables and a respective one or more columns for each of the one of more tables, wherein generating the data uses the column range information and the column relationship information to select data for the dataset such that data records from the dataset are produced as results to executing the obtained query against the dataset.

18. The computer program product of claim 17, wherein the subquery transformation on a subquery of the one or more subqueries comprises:
identifying one or more predicates of the subquery;
converting the identified one or more predicates to at least one predicate of the outer query, wherein converting an identified predicate of the identified one or more predicates comprises, based on identifying a correlation predicate, of the subquery, that correlates table columns, converting at least one predicate of the subquery to a local predicate of the outer query, the local predicate being on a column of the correlated table columns; and
eliminating the subquery such that it does not appear in the transformed query.

19. The computer program product of claim 17, wherein processing a query block for column information comprises rewriting a predicate referencing multiple columns as an equation predicate relating the multiple columns using a literal, wherein the literal indicates a relationship between values of the multiple columns referenced by the predicate.

20. The computer program product of claim 17, wherein processing a query block for column information comprises:
grouping predicates of the query block into predicate groups, each predicate group comprising predicates that reference a respective common set of columns, such that each column referenced by any of the grouped predicates of the query block is referenced only by predicates in one of the predicate groups; and
determining, based on predicates grouped into a predicate group of the predicate groups, a relationship vector that defines a relationship between values of columns referenced by the predicates grouped into that predicate group.

* * * * *